(12) United States Patent
Huang et al.

(10) Patent No.: US 11,687,761 B2
(45) Date of Patent: Jun. 27, 2023

(54) IMPROPER NEURAL NETWORK INPUT DETECTION AND HANDLING

(71) Applicant: Amazon Technologies, Inc., Seattle, WA (US)

(72) Inventors: Randy Renfu Huang, Morgan Hill, CA (US); Richard John Heaton, San Jose, CA (US); Andrea Olgiati, Gilroy, CA (US); Ron Diamant, Albany, CA (US)

(73) Assignee: Amazon Technologies, Inc., Seattle, WA (US)

(*) Notice: Subject to any disclaimer, the term of this patent is extended or adjusted under 35 U.S.C. 154(b) by 1169 days.

(21) Appl. No.: 16/216,485

(22) Filed: Dec. 11, 2018

(65) Prior Publication Data
US 2020/0184245 A1    Jun. 11, 2020

(51) Int. Cl.
*G06N 3/045*    (2023.01)
*G06N 3/04*    (2023.01)
*G06N 3/08*    (2023.01)
*G06F 18/214*    (2023.01)

(52) U.S. Cl.
CPC .......... *G06N 3/045* (2023.01); *G06F 18/214* (2023.01); *G06N 3/04* (2013.01); *G06N 3/08* (2013.01)

(58) Field of Classification Search
CPC ........ G06V 10/98; G06K 9/6256; G06N 3/02; G06N 3/04; G06N 3/0454; G06N 3/0472; G06N 3/08; G06N 20/00; G06N 20/10; G06N 20/20; G06N 3/045; G06F 18/214
See application file for complete search history.

(56) References Cited

U.S. PATENT DOCUMENTS

| | | | |
|---|---|---|---|
| 2016/0217368 A1* | 7/2016 | Ioffe | G06K 9/6277 |
| 2017/0039469 A1 | 2/2017 | Majumdar et al. | |
| 2017/0300805 A1* | 10/2017 | Bhattacharjee | G06N 3/02 |
| 2019/0147323 A1* | 5/2019 | Li | G06N 3/0472 706/15 |
| 2020/0090034 A1* | 3/2020 | Ramachandran | G10L 15/16 |

OTHER PUBLICATIONS

PCT/US2019/064894, "International Search Report and Written Opinion", dated Mar. 5, 2020, 11 pages.
PCT/US2019/064894, "International Preliminary Report on Patentability", dated Jun. 24, 2021, 8 pages.

\* cited by examiner

*Primary Examiner* — Shane D Woolwine
(74) *Attorney, Agent, or Firm* — Kilpatrick Townsend & Stockton LLP

(57) ABSTRACT

Systems and methods for performing improper input data detection are described. In one example, a system comprises: hardware circuits configured to receive input data and to perform computations of a neural network based on the input data to generate computation outputs; and an improper input detection circuit configured to: determine a relationship between the computation outputs of the hardware circuits and reference outputs; determine that the input data are improper based on the relationship; and perform an action based on determining that the input data are improper.

19 Claims, 14 Drawing Sheets

| Layer N | Mean mN | Standard deviation sN |
|---|---|---|

...

| Layer 2 | m2 | s2 |
| Layer 1 | m1 | s1 |
| Layer 0 | m0 | s0 |

510

FIG. 5C

IMPROPER NEURAL NETWORK INPUT DETECTION AND HANDLING

BACKGROUND

Artificial neural networks are computing systems with an architecture based on biological neural networks. Artificial neural networks can be trained, using training data, to learn about how to perform a certain computing task for an application. The trained artificial neural network can then perform the computing task to, for example, generate an inference from input data. The inference result can be utilized/interpreted based on the application. The utility of the inference result can depend on a degree of mismatch between the input data and the training data.

BRIEF DESCRIPTION OF THE DRAWINGS

Various embodiments in accordance with the present disclosure will be described with reference to the drawings, in which:

FIGS. 5A-5C illustrate another example neural network processor and operations of improper input detection supported by the neural network processor, according to certain aspects of the present disclosure;

DETAILED DESCRIPTION

Figure 1:
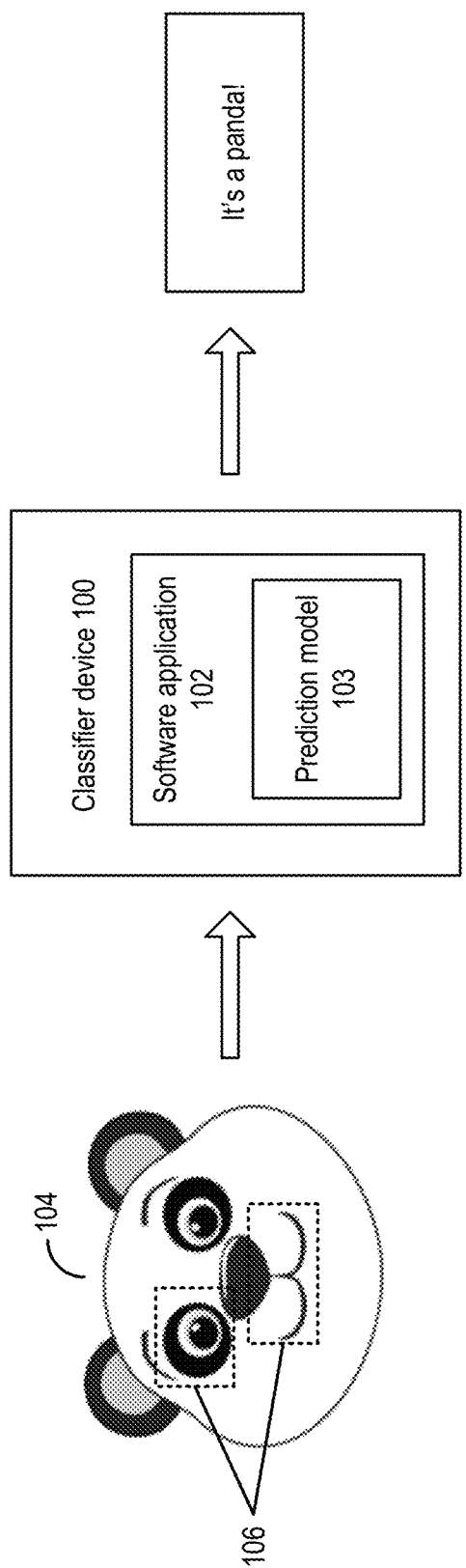
FIG. 1 illustrates an example a classifier device that uses techniques disclosed herein to process data.

Examples of the present disclosure relate to neural network processing, and more specifically, to a system that can detect and handle improper input data to a hardware-implemented neural network. As used herein, "improper input data" may refer to input data that deviate from training data used to train the neural network for an inference objective, with the deviation being so large that an inference operation of the neural network based on the input data does not achieve the inference objective.

In some examples, the system comprises hardware circuits configured to receive input data from an application and to perform computations of a neural network based on the input data to generate neural network outputs. The system further comprises an improper input detection module configured to determine a relationship between the neural network outputs of the hardware circuits and reference neural network outputs. The reference neural network outputs may represent outputs of the neural network having the training data as input. The system can detect that the input data are improper based on a result of the comparison and based on configurable detection criteria, and perform one or more actions based on the detection. The actions may include, for example, transmitting a notification of improper input data to the application, suspending the computations of the neural network at the hardware circuits, etc.

An artificial neural network (herein after "neural network") may include multiple processing nodes. The processing nodes can be divided into layers including, for example, an input layer, a number of intermediate layers (also known as hidden layers), and an output layer. Each processing node of the input layer receives an element of an input set, and scales the element with a weight to indicate the element's degree of influence on the output. Each processing node in an intermediate layer can generate a sum of the scaled elements as an intermediate output, and then generate an output (of the intermediate layer) by applying an activation function to the intermediate output. The outputs of the intermediate layer may represent a lower-level decision that can contribute to the final output of the neural network (e.g., whether a feature is found), which can be processed by subsequent intermediate layers or a subsequent output layer to generate a final output/decision of the artificial neural network.

An artificial neural network can be trained by a training data set to generate a decision, with the training data being configured based on an inference objective for which the decision is made. As an example, the artificial neural network can be trained for an inference objective of recognizing a specific cat from a cat image, and the training data can include a set of images of that cat and other cats. As another example, the artificial neural network can be trained for an inference objective of recognize the voice of a person from audio signals of human voices, and the training data can include voice samples of that person and the voice samples of other persons. In both examples, through the training, the weights in the neural network can be updated with the objective of maximizing the likelihood of the trained neural network generating the correct inference from the input data.

The likelihood of the neural network generating the correct inference, however, may depend on the neural network receiving proper input data. If improper input data are provided to the neural network, the neural network may still generate an inference result, but the inference operation based on the improper input data does not satisfy the inference objective. Referring to the examples described above, a neural network may be trained with a set of cat images to recognize a specific cat from a cat image, but then a dog image is input to the trained neural network to generate an inference result. Moreover, a neural network may be trained with a set of voice samples of a person to recognize the person's voice from audio signals of human voices, but then non-human sound signals are input to the trained neural network to generate an inference result. In both cases, the input data are not the type of data the neural network are trained to handle, and the inference operations of the neural network does not achieve the interference objective.

Currently, a neural network processor does not have the capability to detect improper input data or to signal that an inference operation is based on improper input data. As a result, an application that uses the inference result does not have the information to determine a validity of the inference result, and may perform operations based on invalid inference results. For example, an application may automatically feed a dog image of a video feed to a neural model trained to recognize a cat from cat images, receive an inference result that the dog image includes a cat, and indicate to a user of the application that the cat is detected. As a result, the user may use or otherwise rely on the inference result without being aware that the inference result is based on improper input data. This can degrade not only the utility of the neural network inference operations but also user experience.

Examples of the present disclosure relate to neural network processing, and more specifically, to a system that can detect and handle improper input data to a hardware-implemented neural network. In some examples, the system comprises hardware circuits configured to receive input data from an application and to perform computations of a neural network based on the input data to generate neural network outputs. The system further comprises an improper input detection module configured to determine a relationship between the neural network outputs of the hardware circuits and reference neural network outputs. The reference neural network outputs may represent outputs of the neural network having the training data as input. The system can detect that the input data are improper based on a result of the comparison and based on configurable detection criteria, and perform one or more actions based on the detection. The actions may include, for example, transmitting a notification of improper input data to the application, suspending the computations of the neural network at the hardware circuits, etc.

Compared with current neural network processors which do not have the capability to detect or signal improper input data, examples of the present disclosure enable improper input data to be detected. In some examples, the application (and/or the user operating the application) to be notified about the improper input data, which enables the user to become aware of potential limits in the inference operations and to make judgments about the reliability of the inference outputs. Moreover, in some examples, the system can also suspend the neural network computations upon detection of improper input data. Such arrangements can reduce the likelihood of wasting precious neural network processing resources in invalid inference operations, which can improve the management and utilization of the neural network processing resources. Further, the detection of improper input data can be based on configurable detection criteria, and the detection criteria can be independently configured for different applications, use cases, and/or different users. This allows the improper input data detection to become more flexible and adaptable, which can improve the utility of the neural network processing as well as user experience.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example classifier device 100 that uses techniques disclosed herein to process data. Classifier device 100 can be, for example, a computing device operating a software application 102 and a prediction model 103 to predict information included in a data sequence, and perform a predetermined function based on the prediction. For example, classifier device 100 can be part of an image recognition service provided to identify certain objects (e.g., text, a person, etc.) from an image. It is understood that the image recognition service is merely provided as an illustrative example, and that techniques disclosed herein can be used for other data processing applications including, for example, text-based data processing (e.g., processing of search queries), audio data processing, etc. Moreover, classifier device 100 may operate a number of different prediction models to process different input data, either in parallel or at different times.

In some examples, the image recognition service can be provided in a multi-tenant compute service system. The multi-tenant compute service system may typically include a plurality of servers that can host data and be used by multiple clients or organizations to run instances, such as virtual machine instances or bare-metal instances (e.g., operating systems that run directly on the server hardware). In most instances, such as bare-metal or virtual machine instances, a multi-tenant compute service system may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 1, the multi-tenant compute service system may provide the image recognition service when the client needs it, and the service is decommissioned when it is no longer needed, such that the resources supporting the image recognition service (e.g., access to software application 102, and the underlying hardware resources for processing software application 102) can be reallocated to other clients. Different clients (or one client) may request application 102 to perform processing of different input data using the same or different prediction models including prediction model 103.

In the example of FIG. 1, software application 102 can receive pixel data of an image 104 from a user. Image 104 may include an array of pixels. Software application 102 can perform analysis on the pixel data, and predict one or more objects 106 depicted in image 104. The analysis may include, for example, comparing the pixel data against a set of predetermined features data. The predetermined features data may include data associated with a set of predetermined visual image features such as, for example, a nose object, a mouth object, etc. The predetermined features data may also include data associated with non-visual image features, or a combination of visual and non-visual image features. As to be discussed in more detail below, software application 102 may employ prediction model 103 to compute a set of scores based on the pixel data of image 104. The set of scores may represent, for example, the likelihood of image 104 including the image features represented by the features data. Software application 102 can then determine other information about the content of image 104 based on the scores. For example, based on the scores, software application 102 can determine that image 104 is an image of, for example, a panda, a cat, or other objects. The present disclosure provides examples of techniques to allow trade-off between speed and precision of operating prediction model 103, as to be discussed below.

Figure 2A:
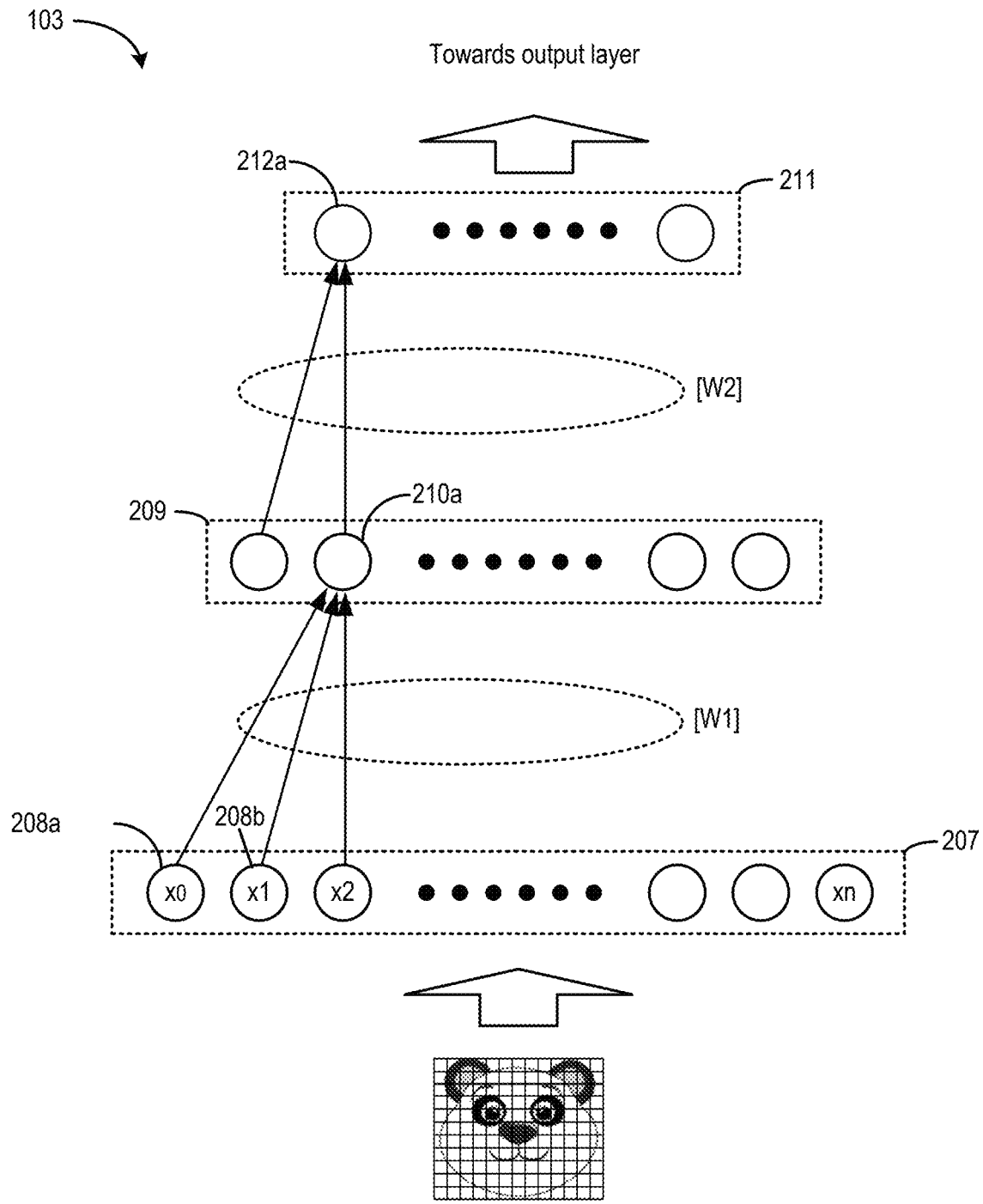
FIGS. 2A and 2B are simplified block diagrams illustrating a prediction model and the computations that use techniques disclosed herein, according to certain aspects of the present disclosure.

Prediction model 103 can be in the form of an artificial neural network. The artificial neural network may include a plurality of processing nodes, with each processing node configured to process part of the input pixel data, or to further process the intermediate outputs from other processing nodes. FIG. 1 illustrates an example of prediction model 103 that uses techniques disclosed herein. In FIG. 1, prediction model 103 may be a multi-layer neural network such as a deep neural network (DNN), a convolutional neural network (CNN), etc. Prediction model 103 may include an input layer 207, a set of intermediate layers including intermediate layers 209 and 211, and an output layer (not shown in FIG. 2A). It is understood that prediction model 103 can also include other different types of neural networks including, for example, long short-term memory (LSTM), multilayer perception (MTP), multiscale densenet (MSD-NET), etc.

Layer 207 may process pixel data representing different portions of image 104. For example, in the example of FIG. 2A, layer 207 may process the pixel data of image 204. Each processing node of layer 207 is assigned to receive a pixel value (e.g., $x_0, x_1, x_2, \ldots x_n$) corresponding to a predetermined pixel within image 104, and transmit one or more weights with the received pixel value to layer 209. In a case where prediction model 203 is a DNN, each processing node of layer 207 can be assigned a set of weights defined based on a matrix W1. Each processing node of layer 207 can send the received pixel value and the assigned weights to each processing node of layer 209. In a case where prediction model 103 is a CNN, groups of the processing nodes of layer 207 may share a set of weights, and each group may send the set of weights and the pixel values received by the group of processing nodes to a single processing node of layer 209. Different neural network models may include different topologies (e.g., including a different number of layers, different connections between layers, etc.), and/or include a different set of weights for each layer.

Layer 209 may process the scaled outputs from layer 207 to generate a set of intermediate outputs. For example, assuming processing node 210a of layer 209 is connected to n processing nodes in layer 207, processing node 210a may generate a sum of the scaled outputs received from layer 207 based on the following equation:

$$\text{sum}_{210a} = \Sigma_{i=0}^{n}(W1_i \times x_i) \qquad \text{(Equation 1)}$$

Here, $\text{sum}_{210a}$ represents an intermediate output generated by processing node 210a. $W1_i \times x_i$ represents a scaling of a particular pixel value (e.g., $x_0$) with the associated weight (e.g., $W1_0$) by a processing node of layer 207. In a case where prediction model 103 is a DNN, each processing node of layer 209 may generate the sum based on the scaling of pixel values from each processing node of layer 207, and then generate a sum (e.g., $\text{Sum}_{210a}$) by summing the scaled pixel values. The sum may also represent a dot-product between an input vector comprising a number of elements (e.g., pixel values) and a weight vector (e.g., W1).

Figure 2B:
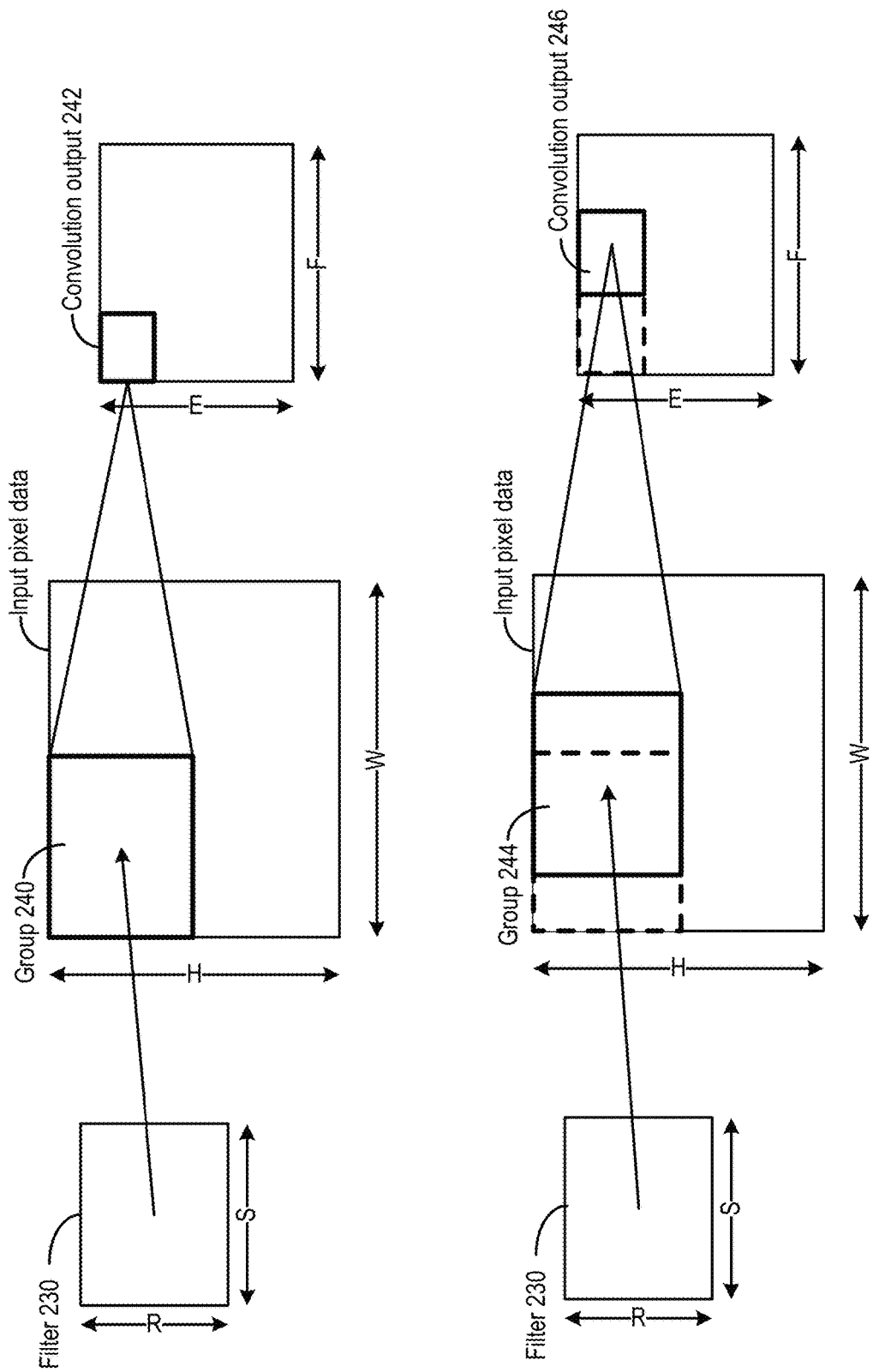

In a case where prediction model 103 is a CNN, each processing node of layer 209 may generate the intermediate output based on the scaling of pixel values from a group of processing nodes of layers 207. The intermediate output may represent a convolution result between a group of pixel values and a filter comprising the weight values. FIG. 2B illustrates an example of a convolution operation that layer 209 may perform. In FIG. 2B, filter 230 may include a two-dimensional array of weights. The weights in filter 230 may represent a spatial distribution of pixels for certain features to be detected from the image. The two-dimensional array may have a height of R rows and a width of S columns, and is typically smaller than an input image with a height of H pixels and a width of W pixels. Each weight may be mapped to a pixel in a rectangular block of pixel values with the same R rows and S columns. A processing node of layer 209 (e.g., processing node 210a) can receive, from a group of processing nodes of input layer 207, a group 240 of pixel values corresponding to a first rectangular block of pixels from the input image, and generate a convolution output 242 based on a summation of multiplication results between each weight of filter 230 and each corresponding pixel in group 240 according to Equation 1, to generate a dot-product between a matrix represented by filter 230 and a matrix represented by group 240. Another processing node of layer 209 can also receive, from another group of processing nodes of input layer 207, a group 244 of pixel values corresponding to a second rectangular block of pixels from the input image, and generate a convolution output 246 based on a summation of multiplication results between each weight of filter 230 and each corresponding pixel in group 244 according to Equation 1, to generate a dot-product between the matrix of filter 230 and a matrix represented by group 240. In some examples, each convolution output in FIG. 2B (e.g., convolution output 242, convolution output 346, etc.) can correspond to the output of a processing node of layer 209. In some examples, the pixel data in the input image may be referred to as an input feature map to indicate that the pixels are processed by the same filter (or same sets of filters) corresponding to certain feature(s). The convolution outputs may be referred to as an output feature map to indicate that the output is the result of processing an input feature map with the filter.

As shown in FIG. 2B, the convolution operations can be arranged in a sliding-window such that the second rectangular block overlaps, or is otherwise adjacent to, the first rectangular block in the input image. For example, in the example of FIG. 2B, D may be a distance of stride (in pixel) of the sliding-window for each convolution operation, such that the block of pixels corresponding to group 244 may be situated at a distance D (in terms of pixels) from the block of pixels corresponding to group 240, and the next block of pixels may also be situated at the same distance D from group 244. Other processing nodes of layer 209 may also receive groups of pixels corresponding to other rectangular blocks and generate other intermediate outputs. The convolution outputs can be part of a convolution output array. The array of convolution outputs can have a smaller height and a smaller width than the input image. Rectangular blocks of the convolution outputs can be further grouped, and convolution operations can be performed at layer 211 between the groups of convolution outputs and another set of filter weights to generate another set of convolution outputs.

Referring back to FIG. 2A, one processing node of layer 209 may be configured to generate the convolution output elements of one convolution output array, and a set M of processing nodes of layer 209 can correspond to a set M of convolution output arrays. The processing node of layer 209 can also process each convolution output with an activation function to generate an activation output. The activation function may translate the convolution output into a decision of whether to forward the convolution output to intermediate layer 211 to influence the classifier decision (analogous to the firing of a biological neuron). An example of the activation function can be a rectified linear unit (ReLU) defined according to the following equation:

$$ReLU(x) = \begin{cases} x & \text{for } x \geq 0 \\ 0 & \text{for } x < 0 \end{cases} \qquad \text{(Equation 2)}$$

In addition to ReLU, other forms of activation function can also be used including, for example, a softplus function (which can be a smooth approximation of a ReLU function), a hyperbolic tangent function (tanh), an arc tangent function (arctan), a sigmoid function, a Gaussian function, etc.

A processing node of layer 209 (e.g., processing node 210a) may process the sum with the ReLU function to generate a first output of layer 209 based on the following equation:

$$\text{first\_output}_{210a} = \text{ReLU}(\text{Sum}_{210a}) \quad \text{(Equation 3)}$$

Layer 211 may further process the scaled intermediate outputs from layer 209 by, for example performing additional convolution operations based on different sets of filters. The outputs from each processing node of layer 211 may be forwarded to other higher intermediate layers, or to an output layer (not shown in FIG. 2A). The output layer may form an output vector representing, for example, a probability that certain features are included in image 104, and/or a probability that image 204 includes an image of a panda. For example, the output vector may be compared against a reference vector associated with a nose object of a panda, or a reference vector associated with a panda. A decision about whether image 104 is an image of a panda can be determined based on the comparison result.

As described above, a neural network computation may include multiplication and summation computations to compute a set of weighted sums (e.g., Equation 1), followed by activation function processing (Equations 2 and 3) on the set of weighted sums to generate a set of activation function outputs for the set of weighted sums. Each of the activation function outputs may represent a vote or an influence (in terms of both degree and direction) by a weighted sum on a decision. For example, the in a case where the inputs are pixel data of an image, and the weights represent a feature to be recognized from the image, each activation function output may represent an influence of a pixel on the decision of whether the feature is included in the image.

Figure 3A:
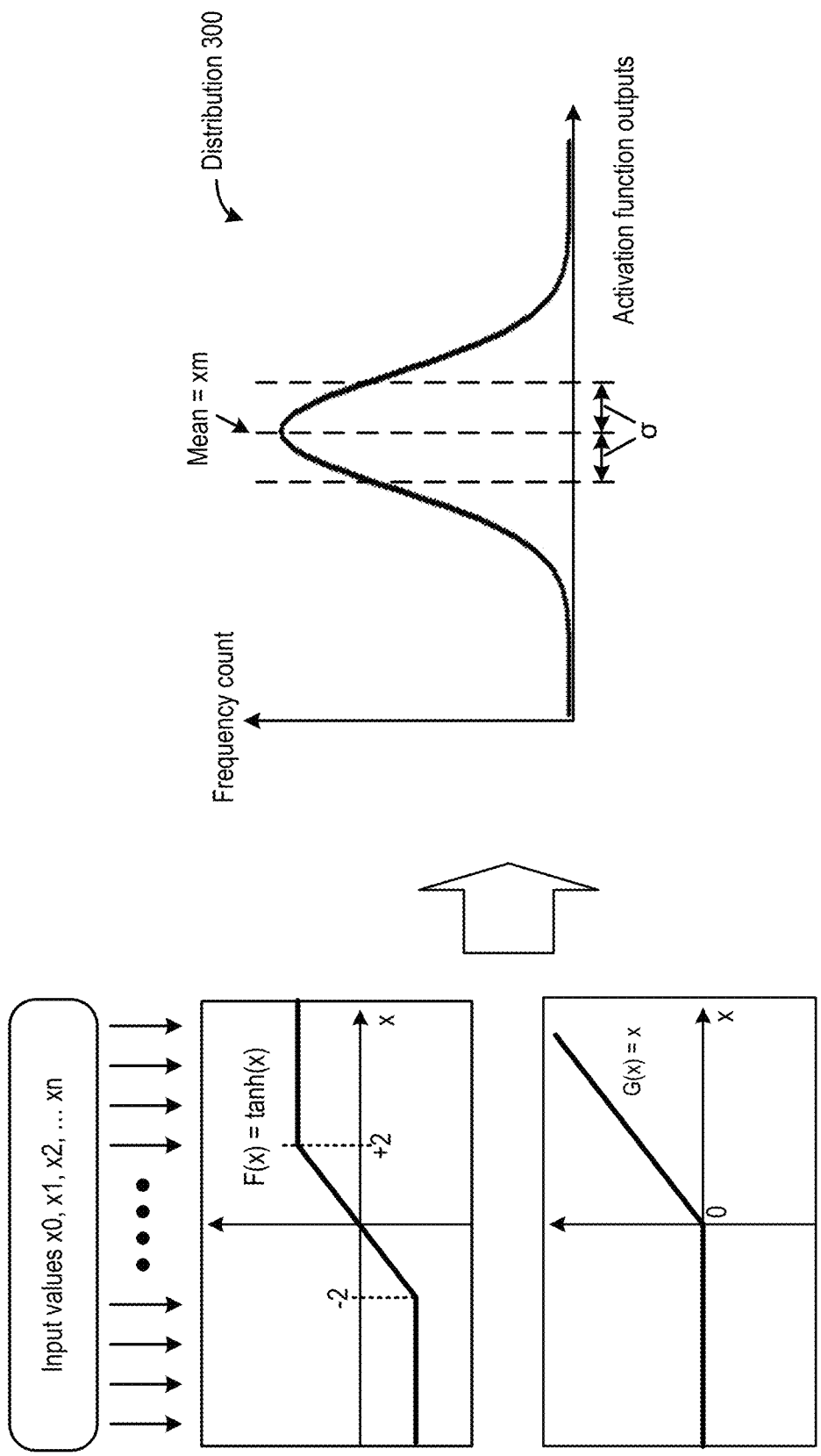
FIGS. 3A and 3B illustrate examples of distribution of outputs generated by the prediction model of FIGS. 2A and 2B, according to certain aspects of the present disclosure.

Some activation functions can generate a distribution of outputs from a set of weighted sums. FIG. 3A illustrates examples of distribution of outputs from activation function processing. As shown in FIG. 3A, a tan h function F(x) can output a range of values for an input range between −2 and +2. Moreover, a ReLU function G(x) can also output the input value if the input value is larger than zero. An activation function such as tan h function and the ReLU function can map the set of weighted sums to a set of outputs, and the set of outputs can be modelled by a distribution function 300. Distribution function 300 can be specific for the input data set and may vary between different input data sets. For example, as shown in FIG. 3A, the distribution of the activation function outputs for input values x0, x1, . . . xn can follow a Gaussian distribution function having a mean of xm and a standard deviation σ, but it is understood that other different input data sets can generate activation function outputs that follow other distribution functions.

Figure 3B:
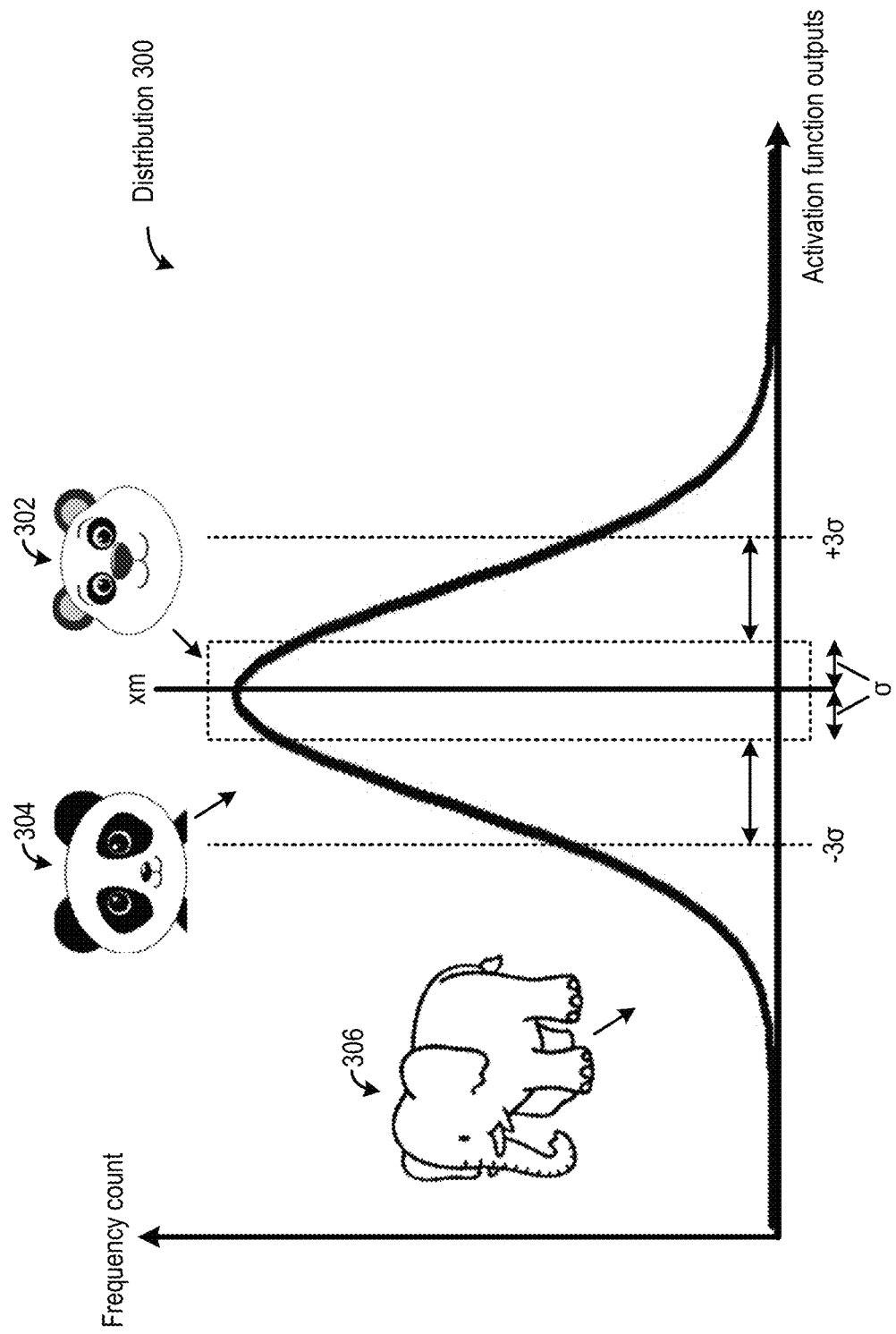

In some examples, the input values x0, x1, . . . xn can be part of a training data set used to train the neural network (e.g., by modifying the weights) to perform a specific inference operation. An activation function outputs distribution from the training data set can provide a reference distribution which can serve as a baseline of inference decision. As an example, as shown in FIG. 3B, input pixels that generate activation function outputs that lie within one sigma of mean xm can be regarded as including a target panda 302, whereas input pixels that generate activation function outputs that lie between one standard deviation and three standard deviations from mean xm can be regarded as including a different panda 304. Based on a relationship between activation function outputs of the input pixels and the activation function outputs distribution of the training data, a decision for an inference objective (e.g., to determine whether the image contains panda 302 or other pandas) can be made by the neural network.

The validity or reliability of the decision, however, may degrade if the neural network is provided with a set of improper input data which the neural network is not trained to process, such that an inference operation performed based on the input data does not achieve the inference objective. For example, image data containing an elephant 306, which can generate activation function outputs that lie outside the three standard deviations range, can be improper input data for the neural network if the neural network is not trained to process elephant images. In such a case, an inference operation based on the image data of elephant 306 does not achieve the target inference objective (to determine whether the image contains panda 302 or other pandas in this example), and any inference decision based on the image data of elephant 306 should be interpreted with the knowledge that the decision is based on input data which the neural network is not trained to process.

Figure 4A:
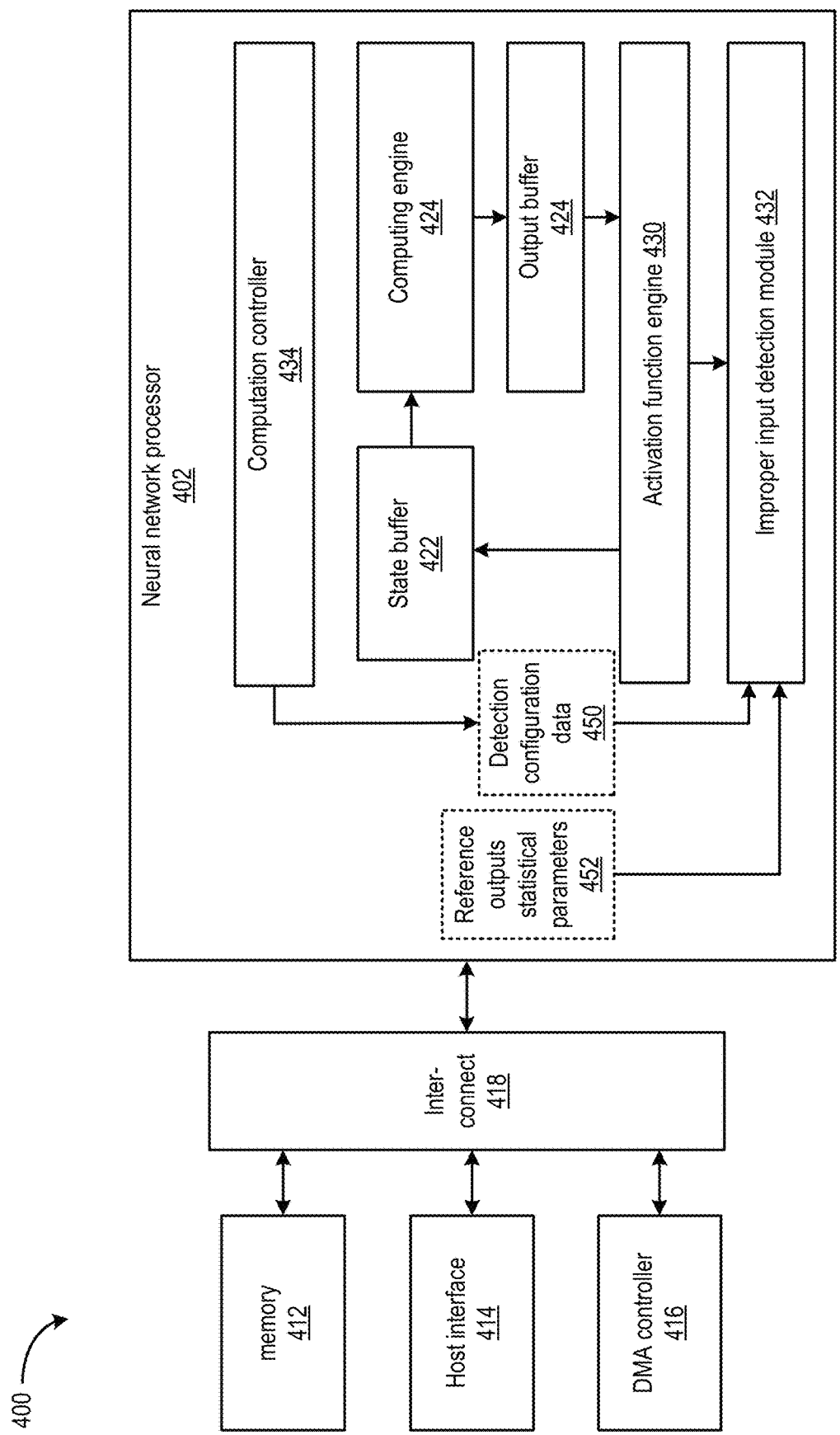
FIGS. 4A-4D illustrate an example neural network processor and operations of improper input detection supported by the neural network processor, according to certain aspects of the present disclosure.

FIG. 4A shows an apparatus 400 according to some embodiments of the present disclosure. Apparatus 400 may be part of a computer system, e.g., a host server. Apparatus 400 may be part of a multi-tenant compute service system and can communicate with a host device (not shown in FIG. 4) to provide computing and memory resources for a computing service. For example, referring back to FIG. 1, apparatus 400 may provide computing and memory resources for computations with prediction model 103. A host device can operate software application 102 and communicate with apparatus 400 to perform one or more image recognition tasks based on computations with prediction model 103. The host device may transmit multiple image data sets associated with multiple contexts, and provide the multiple image data sets to apparatus 400, which can generate multiple outputs to predict, for example, whether each of the multiple image data sets includes a predetermined object.

In the example of FIG. 4A, apparatus 400 may include a neural network processor 402 coupled to memory 412, a direct memory access (DMA) controller 416, and a host interface 414 via an interconnect 418. As to be discussed in more detail, neural network processor 402 can provide the computing resources to support the computations with prediction model 103. Neural network processor 402 can include an integrated circuit such as, for example, a System-on-Chip (SoC). Memory 412 may be configured to store the instructions, input data (e.g., pixel groups 249 and 244 of FIG. 2B) and the weights (e.g., filter 230) received from the host device. Memory 412 may also be configured to store the output of neural network processor 402 (e.g., convolution outputs 242 and 246 of FIG. 2B). Memory 412 may include any suitable memory, e.g., dynamic random access memory (DRAM), synchronous DRAM (SDRAM), double data rate DRAM (DDR DRAM), storage class memory (SCM), flash memory devices, etc.

DMA controller 416 may be configured to perform DMA operations to transfer data between neural network processor 402 and the host device. For example, as discussed above, the host device can store the instructions, input data, and the weights at memory 412. The host device can provide the memory addresses for the stored instructions, data, and weights to neural network processor 402 (e.g., in the form of memory descriptors). Neural network processor 402 can then obtain the stored instructions, data, and weights based on the memory addresses provided by the host device. Neural network processor 402 can also store the results of computations (e.g., one or more image recognition decisions) at memory 412, and provide the memory addresses for the stored results to the host device.

Host interface 414 may be configured to enable communication between the host device and neural network processor 402. For example, host interface 414 may be configured to transmit the memory descriptors including the memory addresses of the stored data (e.g., input data, weights, results of computations, etc.) between the host device and neural network processor 402. Host interface 414 may include, for example, a peripheral component interconnect express (PCIe) interface or any suitable interface for communicating with the host device.

Neural network processor 402 can provide the computing resources to support the computations with one or more instances of prediction model 103. As shown in FIG. 3A, neural network processor 402 may include a state buffer 422, a computing engine 424, an output buffer 428, an activation function engine 430, an improper input detection module 432, and a computation controller 434.

State buffer 422 can provide caching of data used for computations at computing engine 424. The data cached at state buffer 422 may include, for example, the input data, weights, and biases acquired from memory 412, as well as intermediate outputs of computations at computing engine 424. The caching can reduce the effect of memory access bottleneck (e.g., caused by the latencies at memory 412, DMA controller 416, interconnect 418, etc.) on the performance of computing engine 424. State buffer 322 can be an on-chip memory device and may include, for example, static random access memory (SRAM).

State buffer 422 can be controlled by computation controller 434 to fetch weights, bias, and input data to a neural network layer to computing engine 424. Computing engine 424 can perform neural network computations for that neural network layer based on the weights, bias, and input data to generate weighted sums. Computing engine 424 may include a set of circuitries configured to perform one or more arithmetic operations involved in neural network computations. For example, computing engine 424 may include a set of multipliers to perform the scaling of input data with associated weights, and a set of adders to generate a sum of the results of multiplications representing dot-products and convolution results, as discussed above. The weighted sums can be collected and accumulated at output buffer 428 to generate intermediate output data. Output buffer 428 can provide the intermediate output data to activation function engine 430 to perform activation function processing to generate the outputs of a neural network layer. The outputs can be stored in state buffer 422, which can fetch the outputs, as well as a new set of weights and bias, to computing engine 424 to perform neural network computations for the next neural network layer.

In addition, improper input detection module 432 can detect improper input data stored in state buffer 422 and supplied to computing engine 424 to perform the neural network computations. The improper input data can include input data for a specific neural network layer, for the entire neural network, etc. As to be described below, improper input detection module 432 can perform the detection based on the output data generated by activation function engine 430, and based on detection configuration data 450 from computation controller 434. In some examples, detection configuration data 450 can include, for example, thresholds information for determining whether an output data element (of the output data) from activation function engine 430 is an outlier, which can indicate that input data element corresponding to the output data element is improper. Detection configuration data 450 can also include thresholds information that set a number of outlier data elements to be detected (for a neural network layer, for multiple neural network layers, etc.) for improper input detection module 432 to determine that the entire set of input data supplied to computing engine 424.

Although FIG. 4A illustrates that improper input detection module 432 is part of neural network processor 402, it is understood that improper input detection module 432 can also be part of a software application or firmware that interfaces with neural network processor 402. Moreover, although FIG. 4A illustrates that improper input detection module 432 performs detection of improper input data based on the outputs of activation function engine 430, it is understood that the techniques disclosed below can also be used to detect improper input data at other stages of the neural network processing, such as based on certain intermediate output data from the arithmetic circuits within computing engine 424, at other post-processing stages (e.g., pooling), etc.

In some examples, improper input detection module 432 can also obtain reference outputs statistical parameters 452 (e.g., from memory 412 or from state buffer 422) for a distribution model of reference outputs, such as distribution 300 of FIG. 3A-FIG. 3B. As described above, the reference outputs can include outputs generated by a trained neural network model on the set of training data used to train the neural network, and can be associated with the set of weights provided to computing engine 424. As to be described below, improper input detection module 432 can combine reference output statistical parameters 452 with detection configuration data 450 to determine the thresholds and/or other information for detection of improper input data.

Figure 4B:
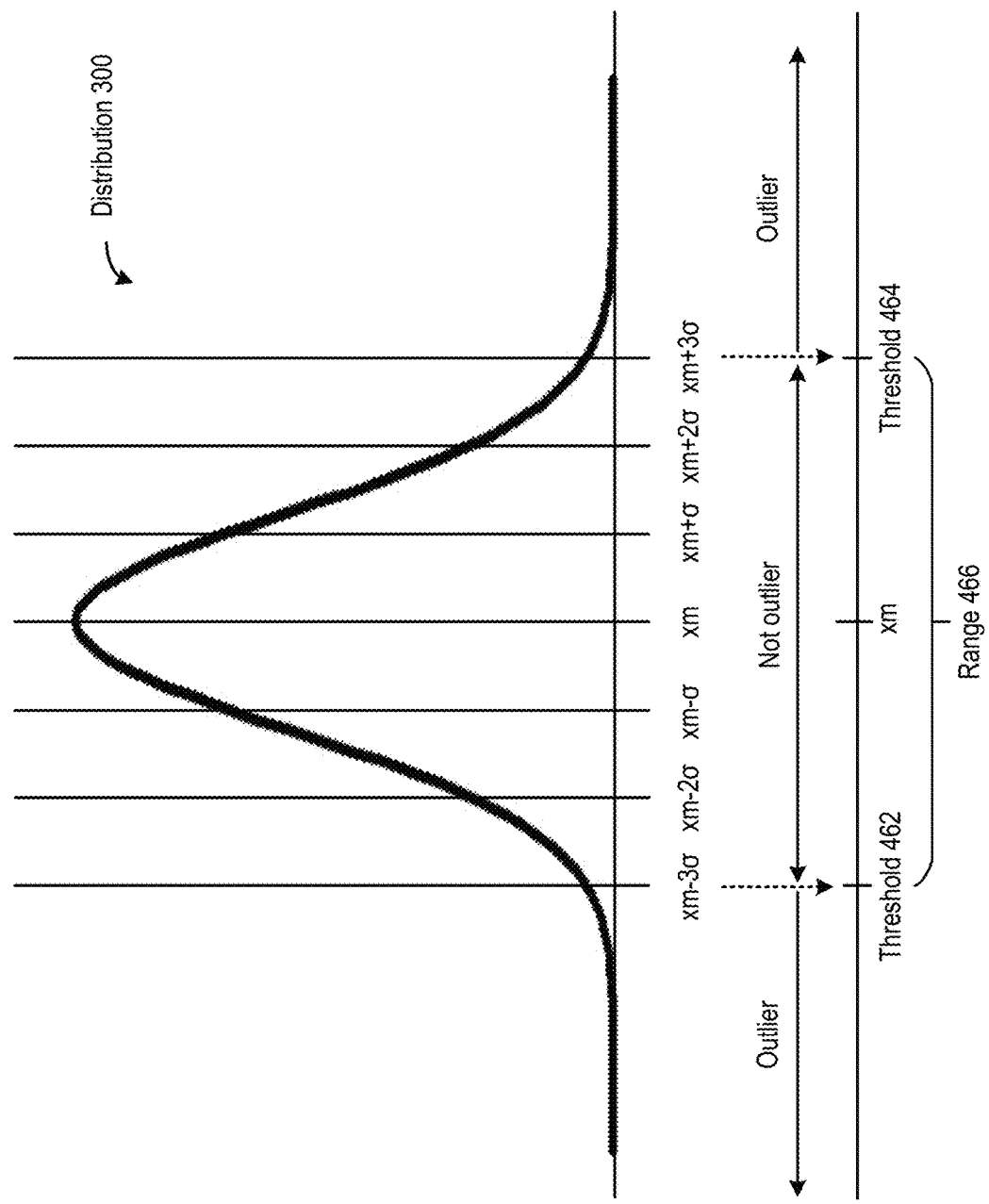

FIG. 4B illustrates an example of an outlier detection scheme 460 that can be employed by improper input detection module 432 to determine whether an output data element is an outlier based on a distribution of reference outputs (e.g., distribution 300). As shown in FIG. 4B, distribution 300 has a mean of xm and a standard deviation of σ. For a specific inference operation, a pair of thresholds can be set based on multiples of standard deviations from the mean xm, and the thresholds can set a range beyond which the output data element can be determined as outlier, which can imply the input data element corresponding to the output data element is improper. For example, as shown in FIG. 4B, a threshold 462 can be set by subtracting three standard deviations from the mean xm (xm−3σ), whereas a threshold 464 can be set by adding three standard deviations to the mean xm (xm+3σ). An output data element that lies within a range 466 between thresholds 462 and 464, centered at mean xm, can be determined as not an outlier, whereas an output data element that lies outside the range (e.g., smaller than threshold 462 or larger than threshold 464) can be determined as an outlier. In some examples, range 466 can be shifted by xm to become centered at zero, and thresholds 462 and 464 can be a multiple of standard deviations added or subtracted from zero.

Detection configuration data 450 and reference output statistical parameters 452 can provide information to improper input detection module 432 to implement detection scheme 460. For example, reference output statistical parameters 452 can include statistical parameters of distribution 300, such as mean xm and standard deviation σ. Moreover, detection configuration data 450 can define the standard deviation multiplier (such as three in FIG. 4B) used for setting thresholds 462 and 464, and the multiplier can be specific to an inference objective, an application, a user, etc.

Figure 4C:
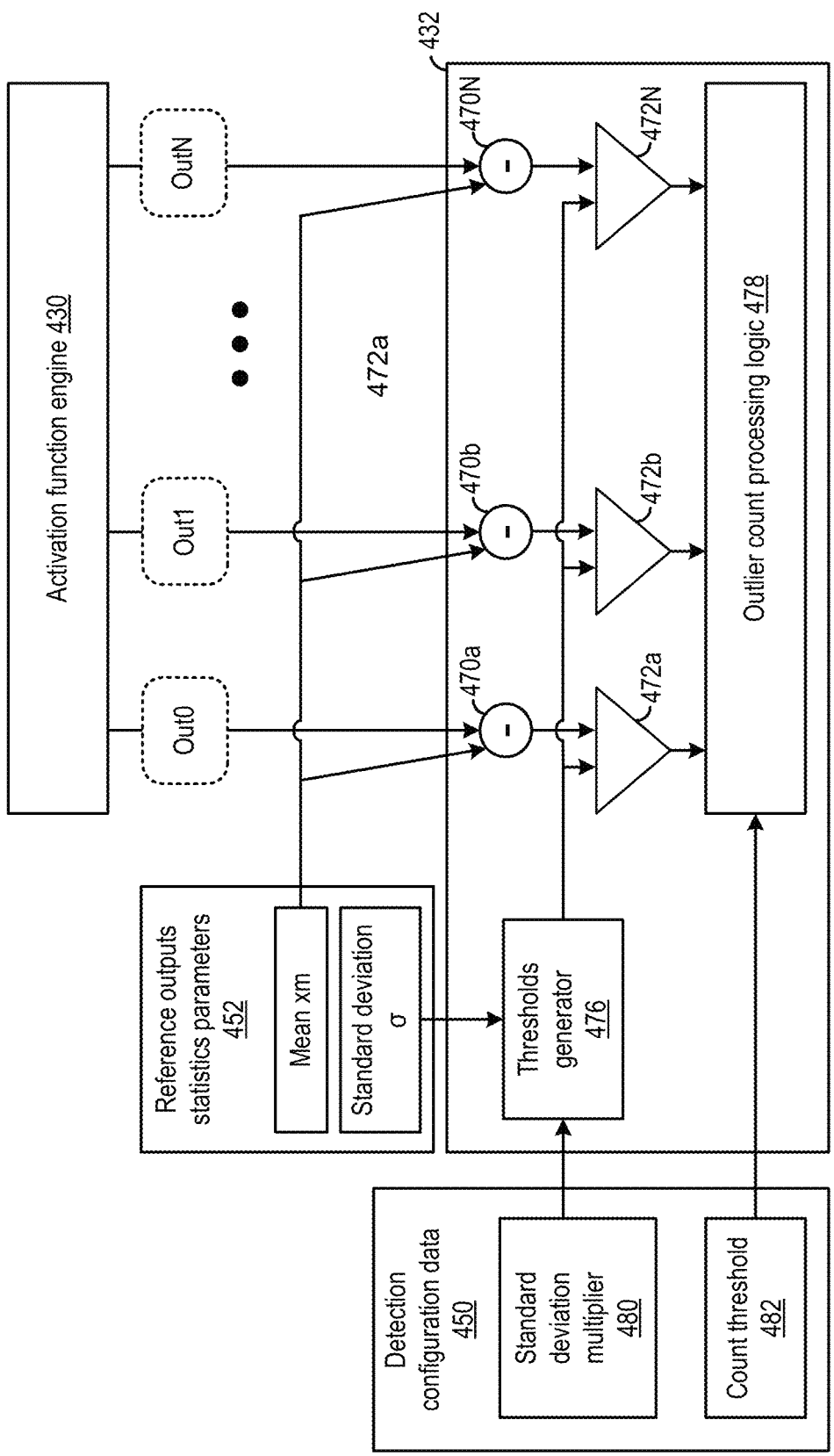

FIG. 4C illustrates an example of internal components of improper input detection module 432. As shown in FIG. 4C, improper input detection module 432 can include a set of subtractors 470 (e.g., subtractors 470a, 470b, . . . 470N, etc.), a set of comparators 472 (e.g., comparators 472a, 472b, . . . 472N, etc.), a thresholds generator 476, and outlier count processing logic 478. Subtractors 470, comparators 472, and thresholds generator 476 can be controlled to perform outlier detection scheme 460 based on detection configuration data 450 and reference output statistics parameters 452. In one example, each of comparators 472 can receive an output data element (e.g., one of out0, out1, . . . outN, etc.) from activation function engine 430 and subtract mean xm (supplied from reference output statistics parameters 452) from the output data element to generate a shifted output data element, which can be compared against range 466 of FIG. 4B which is also shifted to become centered at zero.

In addition, thresholds generator 476 can also receive standard deviation σ from reference output statistics parameters 452, as well as standard deviation multiplier 480, to generate thresholds 462 and 464 of FIG. 4B. With range 466 centered at zero, thresholds generator 476 can generate thresholds 462 and 464 by multiplying standard deviation σ with a multiplier value (e.g., three) set by standard deviation multiplier 480 to generate a multiple. Thresholds 462 and 464 can be, respectively, a negative version and a positive version of the multiple. Each of comparators 472 can compare the shifted output data element against thresholds 462 and 464 provided by thresholds generator 476 to determine whether the shifted output data element is an outlier.

The outlier decision from each of comparators 472 can be provided to outlier count processing logic 478, which can process the outlier decisions based on a count threshold 482 included in detection configuration data 450 to determine, for example, whether the input data set corresponding to output data elements out0, out1, . . . outN are invalid input data. As an example, if count threshold 482 defines a threshold of 10 k, and more than 10 k output data elements are determined to be outlier, outlier count processing logic 478 may determine that the input data set corresponding to output data elements out0, out1, . . . outN are invalid input data.

In some examples, improper input detection module 432 can determine an input data set as improper based on the outlier counts of multiple neural network layers, with priority given to a particular neural network layer. The priority can be specific to a particular inference objective, an application, etc. As an example, for some applications, the lower level layers of a neural network can be trained to recognize a wide range of rudimentary features, and the outlier count can be large for the lower level layers even for proper input data. In contrast, the upper level layers can be trained to consolidate the features recognized by the lower level layers into a smaller set of features, and to generate decision influences based on the smaller set of features. The outlier counts from the upper level layers may be much smaller. In such an example, improper input detection module 432 determine whether the input data is improper based on the outlier counts of the upper level layers alone, or assign larger weights to the outlier counts of the upper level layers.

Figure 4D:
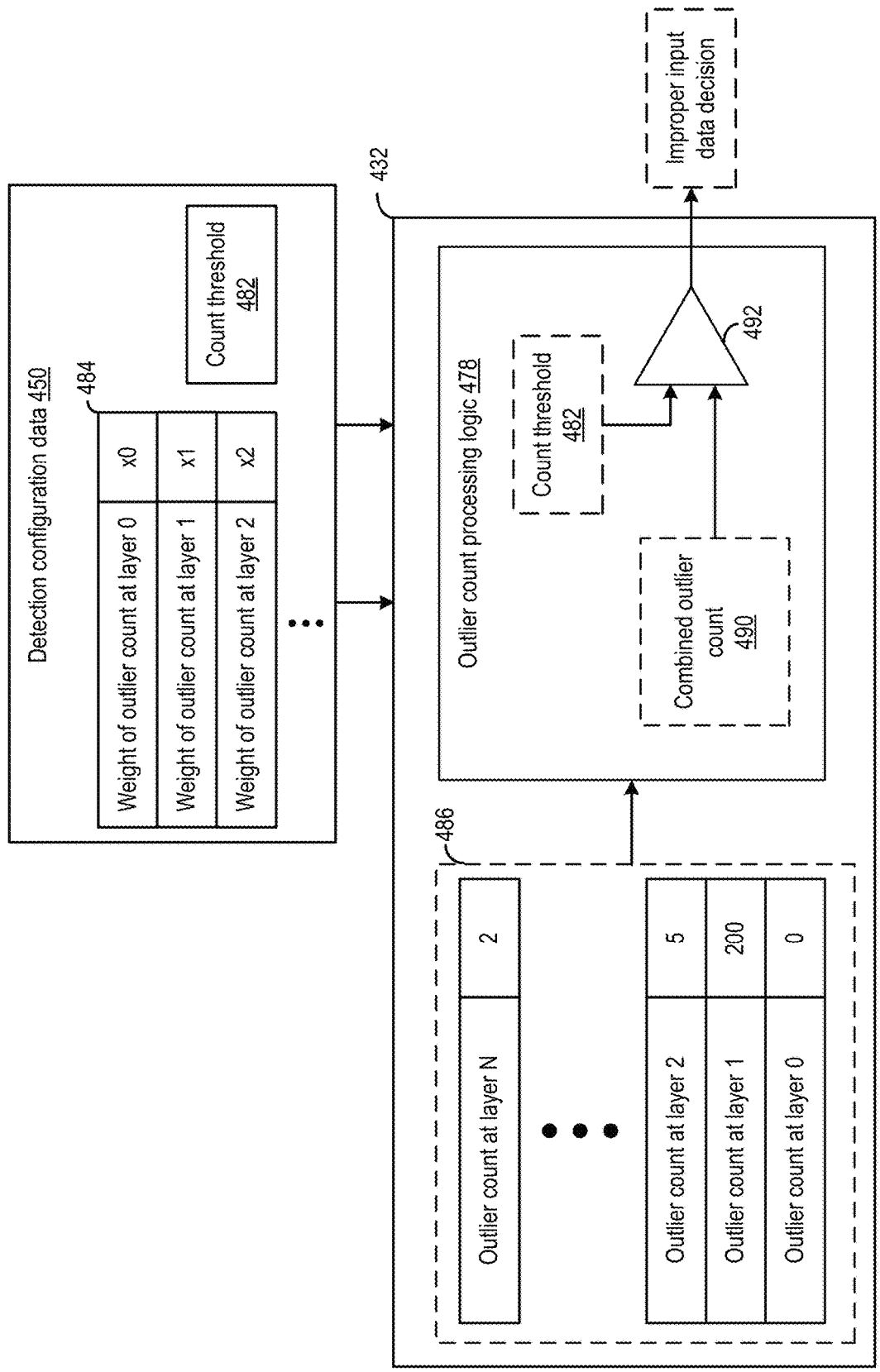

FIG. 4D illustrates an example scheme in which improper input detection module 432 performs improper input detection based on outlier counts for multiple neural network layers. As shown in FIG. 4D, improper input detection module 432 can maintain a record 486 of outlier counts for each neural network layer based on the outlier counts output by outlier count processing logic 478. Improper input detection module 432 can also receive a set of weights 484 for outlier counts of each neural network layer from detection configuration data 450, with higher weights assigned to neural network layers which are pre-determined to have small number of outlier outputs. Different weights can be configured for different inference objectives, applications, users, etc. Outlier count processing logic 478 can determine an aggregate outlier 490 based on a weighted sum of outlier counts in record 486, with each outlier count of a neural network layer weighted according to weights 484. The weighted sum can be compared against count threshold 482 by a comparator 492 to generate an improper input data decision.

Improper input detection module 432 can perform one or more actions based on the detection of improper input data. In one example, improper input detection module 432 can transmit a notification to the application that provides the input data to neural network processor 402 (e.g., software application 102 of FIG. 1). The notification can be transmitted in the middle of the neural network computations, and/or with an inference result, to provide an indication that the input data is improper and/or the inference result is generated based on an improper input data set. In another example, improper input detection module 432 can also transmit a notification to computation controller 434, or other software/hardware components that manage the operations of neural network processor 402, to suspend the neural network computations based on the improper input data set. Such arrangements can minimize the likelihood of wasting neural network processing resources on processing improper input data, which can improve the utilization of the neural network processing resources.

In some examples, improper input detection module 432 can perform improper input detection based on other techniques, such as based on determining a distribution model of outputs of activation function engine 430. The distribution model can then be compared against the reference outputs distribution (e.g., distribution 300) to determine whether the outputs of activation function engine 430 are generated from improper inputs. In some cases, such a detection scheme can provide more accurate detection by considering the output data as a whole rather than determining individual outlier output data elements. For example, a neural network may be trained to by a training data set that has a wide and relatively uniform distribution. It may be difficult to select thresholds for outlier data identification and counting to reflect the wide and (relatively) uniform distribution of the training data set. In such an example, it may be advantageous to compare the distribution model of the outputs with the reference outputs distribution. The comparison can be based on, for example, comparing the statistical parameters of the distributions of the outputs and of the reference outputs.

Figure 5A:
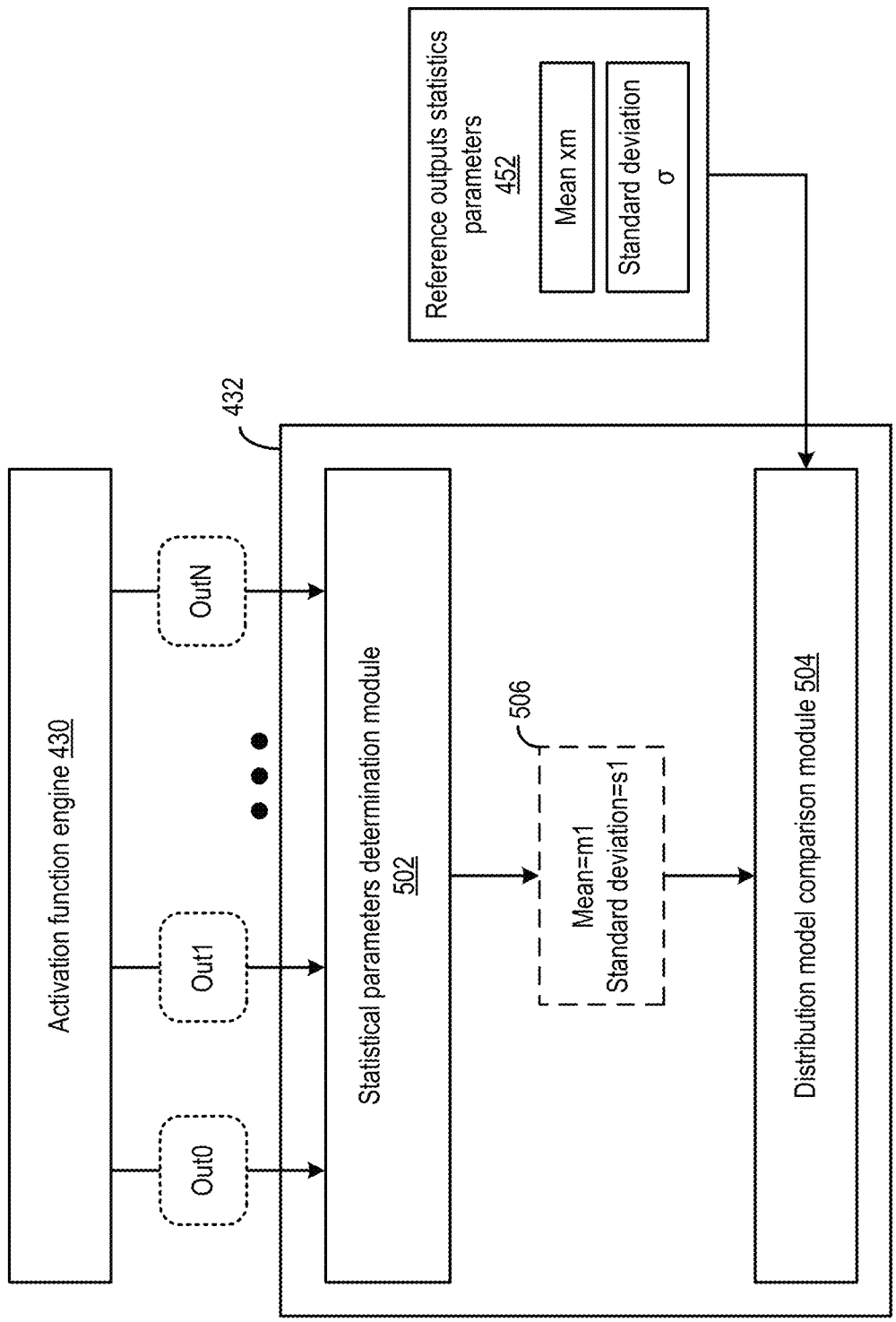

FIG. 5A illustrates an example of internal components of improper input detection module 432 to identify improper input based on distribution model comparison. As shown in FIG. 5A, improper input detection module 432 may include a statistical parameters determination module 502 and a distribution model comparison module 504. Statistical parameters determination module 502 can determine a set of statistical parameters 506, such as mean and standard deviation, to represent a distribution model of outputs of activation function engine 430 (e.g., out0, out1, . . . outN). In some examples, statistical parameters determination module 502 can include arithmetic circuits (e.g., adders, multipliers, dividers, etc.) to compute the mean of outputs of activation function engine 430 (e.g., by computing an average), and to compute the standard deviation (e.g., by computing an average of squared differences between each output and the mean). In the example of FIG. 5A, statistical parameters determination module 502 may determine the mean of the outputs of activation function engine 430 equals to m1, whereas the standard deviation of the outputs equals to s1. In some examples, statistical parameters determination module 502 can compute statistical parameters 506 for each neural network layer.

Distribution model comparison module 504 can compare statistical parameters 506 of the outputs of activation function engine 430 with reference outputs statistics parameters 452 to determine whether the input data are improper. The comparison can be based on a set of rules and thresholds defined in detection configuration data 450 (not shown in FIG. 4D). For example, distribution model comparison module 504 may apply a two-step comparison scheme. As a first step, distribution model comparison module 504 can determine a difference between the mean m1 of the outputs of activation function engine 430 and the mean xm of reference outputs statistics parameters 452. If the difference exceeds a first threshold, distribution model comparison module 504 may determine that the input data are improper. If the difference between the means are within the first threshold, distribution model comparison module 504 can determine a difference between the standard deviation s1 of the outputs of activation function engine 430 and the standard deviation σ of reference outputs statistics parameters 452. If the difference exceeds a second threshold, distribution model comparison module 504 may determine that the input data are improper. But if the difference is also within the second threshold, distribution model comparison module 504 may determine that the input data are proper.

Figure 5B:
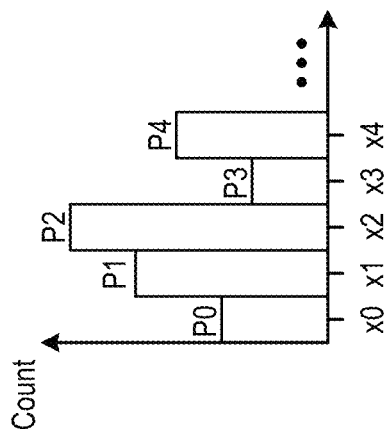
Figure 5B:
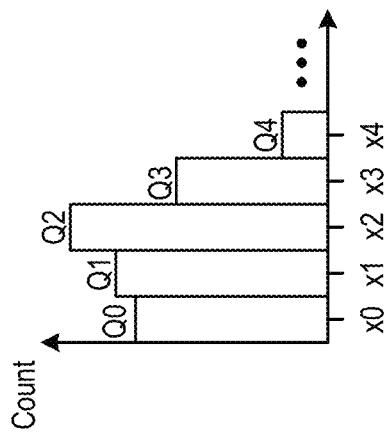

In some examples, distribution model comparison module 504 can also compare distribution model of outputs of activation function engine 430 with the distribution model of reference outputs using other techniques, such as Kullback-Leibler divergence analysis. To support Kullback-Leibler divergence analysis, statistical parameters determination module 502 can perform binning operations on outputs of activation function engine 430 and on the reference outputs. FIG. 5B illustrates an example of results of the binning operations. As shown in FIG. 5B, statistical parameters determination module 502 can maintain a set of bins representing a range of values of outputs of an activation function, including a bin for each of x0, x1, x2, x3, and x4. For example, a bin of x0 represents a range centered at x0, a bin of x1 represents a range centered at x1, etc. Outputs activation function engine 430, as well as reference outputs, can be mapped into each bin. A count distribution for each bin can be obtained to represent the distribution models of outputs of activation function engine 430 and of reference outputs. For example, the distribution model of outputs of activation function engine 430 may include counts Q0, Q1, Q2, Q3, and Q4 for, respectively, bins x0, x1, x2, x3, and x4. Moreover, the distribution model of reference outputs may include counts P0, P1, P2, P3, and P4 for, respectively, bins x0, x1, x2, x3, and x4. Statistical parameters determination module 502 can also compute a probability for each bin based on the respective count and the total count of the distribution. For example, the probability of an output of activation function engine 430 falling into bin x0 can be determined based on the following equation:

$$P(0) = \frac{P0}{\sum_{i=0}^{i=N} Pi} \quad \text{(Equation 4)}$$

In Equation 4, P(0) represents the probability of an output of activation function engine 430 falling into bin x0, P0 is the count of outputs of activation function engine 430 falling into bin x0, whereas is the total of counts of the outputs of activation function engine 430 across all the bins including P0, P1, P2, ... Pn. Probabilities P(1), P(2), ... P(n) for other bins can be computed using Equation 4 to represent the distribution model of outputs of activation function engine 430.

Moreover, the probability of a reference output falling into bin x0 can be determined based on the following equation:

$$Q(0) = \frac{Q0}{\sum_{i=0}^{i=N} Qi} \quad \text{(Equation 5)}$$

In Equation 5, Q(0) represents the probability of a reference output falling into bin x0, Q0 is the count of outputs of reference outputs falling into bin x0, whereas is the total of counts of the reference outputs across all the bins including Q0, Q1, Q2, ... Qn. Probabilities Q(1), Q(2), ... Q(n) for other bins can be computed using Equation 5 to represent the distribution model of reference outputs.

A Kullback-Leibler (KL) divergence between the distribution models of outputs of activation function engine 430 and of reference outputs can be computed based on the following equation:

$$D_{KL}(Q\|P) = \sum_{i=0}^{i=N} \left( Q(i) \times \ln\left( \frac{Q(i)}{P(i)} \right) \right) \quad \text{(Equation 6)}$$

In Equation 6, represents the KL divergence, which can be obtained by multiplying the probability of a bin of the reference output (Q(i) from Equation 5) with a natural log of a ratio between Q(i) and the probability of the bin of the output of activation function engine 430 (P(i) from Equation 4). A larger value can indicate a larger difference between the distribution models, whereas a smaller value can indicate a small difference between the distribution models. The KL divergence value can be compared against a threshold to determine the input data are proper.

In some examples, the statistical parameters 506 computed by statistical parameters determination module 502 may be used to support other operations, such as debugging operation. For example, as shown in FIG. 5C, statistical parameters determination module 502 can generate a record 510 that lists the mean and standard deviations of activation function outputs of each neural network layer. Record 510 can be used as a debugging tool to determine, for example, the hardware resources needed to support the computations for each neural network layer. For example, record 510 can be compared against a set of reference means and standard deviations of outputs of a trained neural network when processing a training data set. Based on the comparison, it can determined which layer starts to exhibit large departure from the reference mean and standard deviation. Adjustments to the hardware resources provided for the computations of that neural network layer (e.g., by having computing engine 424 to represent more processing nodes, increasing the precision of the arithmetic circuits in computing engine 424, etc.) can then be made to minimize the departure.

Figure 6:
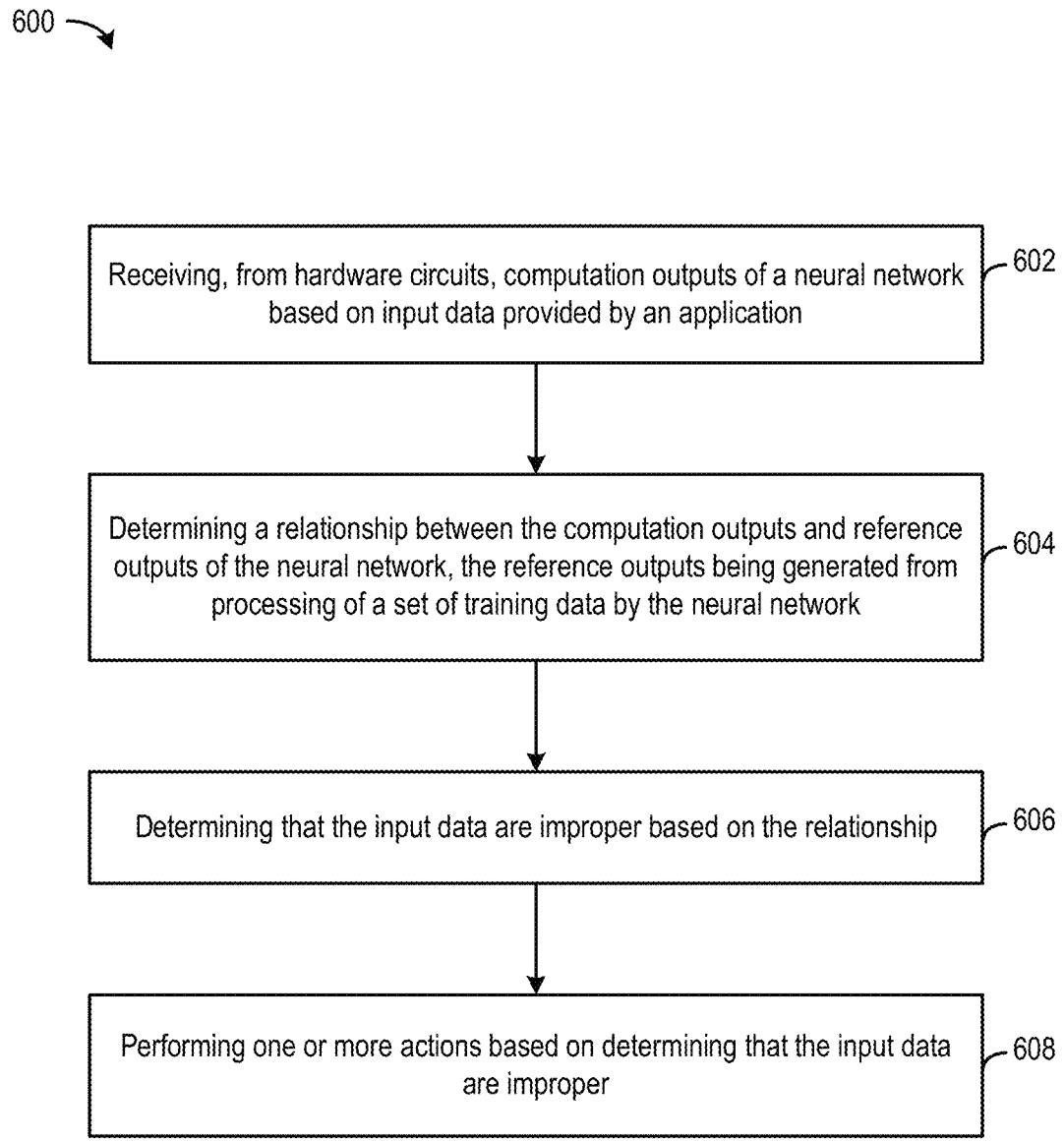
FIG. 6 illustrates an example method of detecting and handling improper input data to a neural network, according to certain aspects of the present disclosure.

FIG. 6 illustrates an example flow diagram of a process 600 for detecting and handling improper input to a neural network. Process 600 can be performed by, for example, various internal components of neural network processor 402 as described in FIG. 4A-FIG. 5B including, for example, improper input detection module 432, and may include the techniques described above.

At operation 602, improper input detection module 432 receives, from hardware circuits, computation outputs of a neural network based on input data provided by an application. The hardware circuits may include activation function engine 430, and the computation outputs may include outputs of the activation function engine 430 for computations of a neural network layer.

At operation 604, improper input detection module 432 determines a relationship between the computation outputs and reference outputs of the neural network layer, the reference outputs being generated from processing of a set of training data set by the neural network. The determination of the relationship can be based on the techniques described with respect to FIG. 4B. For example, a pair of thresholds defining a range (e.g., range 466) can be determined based on the standard deviation of a distribution of the reference outputs, and each computation output can be compared against the thresholds to determine whether the computation output is within the range. If a computation output is within the range, it can be determined that the computation output is not an outlier, whereas if the computation output is beyond the range, it can be determined that the computation output is an outlier. The number of outlier computation outputs can also be counted. As another example, statistical parameters of a distribution model of the computation outputs (e.g., mean and standard deviation) can also be determined, and the statistical parameters of the computation outputs and the reference outputs can also be compared based on the techniques described with respect to FIG. 5A.

At operation 606, improper input detection module 432 determines that the input data are improper based on the relationship. The determination can be based on, for example, the count of outlier computation outputs exceeding a threshold, as described with respect to FIG. 4C and FIG. 4D. The determination can also be based on comparing the distributions of the computation outputs and reference outputs. For example, the mean and standard deviation of the computation outputs distribution can be compared against the mean and standard deviation of the reference outputs distribution exceeding another threshold, as described with respect to FIG. 5A. A Kullback-Leibler (KL) divergence between the distributions can also be determined, as described with respect to FIG. 5B.

At operation 608, improper input detection module 432 can perform one or more actions based on determining that the input data are improper. In one example, improper input detection module 432 can transmit a notification to the application that provides the input data (e.g., software application 102 of FIG. 1). The notification can be transmitted in the middle of the neural network computations, and/or with an inference result, to provide an indication that the input data is improper and/or the inference result is generated based on an improper input data set. In another example, improper input detection module 432 can also transmit a notification to computation controller 434, or other software/ hardware components that manage the operations of neural network processor 402, to suspend the neural network computations based on the improper input data set.

Figure 7:
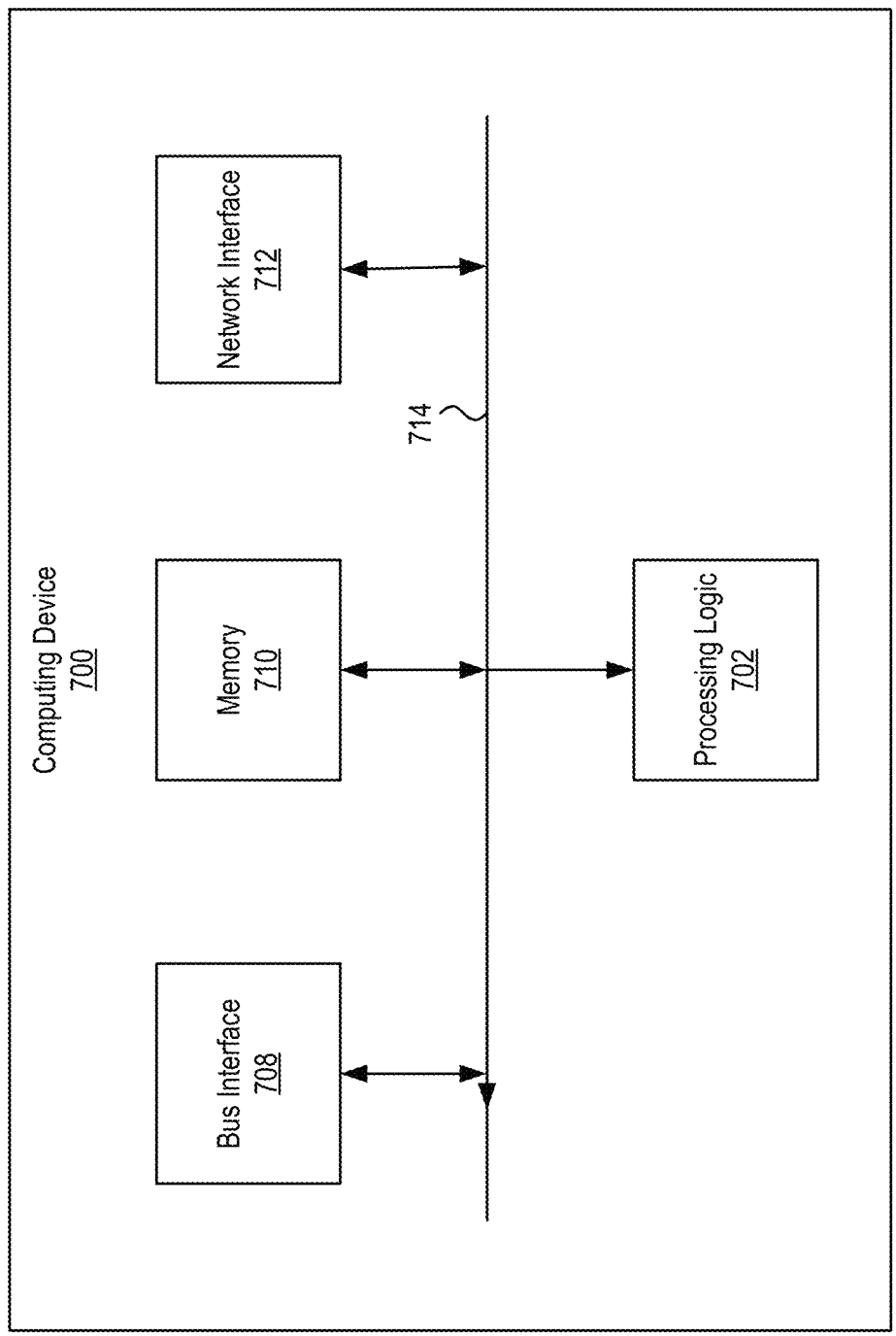
FIG. 7 illustrates an example of a computing device, according to certain aspects of the disclosure.

FIG. 7 illustrates an example of a computing device 700. Functionality and/or several components of the computing device 700 may be used without limitation with other embodiments disclosed elsewhere in this disclosure, without limitations. A computing device 800 may perform computations to facilitate processing of a task. As an illustrative example, computing device 800 can be part of a server in a multi-tenant compute service system. Various hardware and software resources of computing device 700 (e.g., the hardware and software resources associated with provision of an image recognition service) can be allocated to a client upon request.

In one example, the computing device 700 may include processing logic 702, a bus interface module 708, memory 710, and a network interface module 712. These modules may be hardware modules, software modules, or a combination of hardware and software. In certain instances, modules may be interchangeably used with components or engines, without deviating from the scope of the disclosure. The computing device 700 may include additional modules, not illustrated here. In some implementations, the computing device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include one or more integrated circuits, which may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710. Processing logic 702 may also include hardware circuities for performing artificial neural network computation including, for example, neural network processor(s) 402, etc.

The access to processing logic 702 can be granted to a client to provide the personal assistant service requested by the client. For example, computing device 700 may host a virtual machine, on which an image recognition software application can be executed. The image recognition software application, upon execution, may access processing logic 702 to predict, for example, an object included in an image. As another example, access to processing logic 702 can also be granted as part of bare-metal instance, in which an image recognition software application executing on a client device (e.g., a remote computer, a smart phone, etc.) can directly access processing logic 702 to perform the recognition of an image.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the computing device 700, while in other cases some or all of the memory may be external to the computing device 700. The memory 710 may store an operating system comprising executable instructions that, when executed by the processing logic 702, provides the execution environment for executing instructions providing networking functionality for the computing device 700. The memory 710 may also store, for example, software applications for performing artificial neural network computation. For example, memory 710 may store software routines related to the computations of the equations above. In a case where processing logic 702 is in the form of FPGA, memory 710 may store netlists data representing various logic circuit components of processing logic 702. In some examples, memory 710 can include memory 412.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 808 may include the physical layer for any of these bus protocols, including a connector, power management, and error handling, among other things. In some implementations, the computing device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 700 may include multiple network interface modules, each configured to communicate with a different network. For example, in these implementations, the computing device 700 may include a network interface module for communicating with a wired Ethernet network, a wireless 802.11 network, a cellular network, an Infiniband network, etc. In some embodiments, computing device 700 may receive a set of parameters, such as the aforementioned weight vectors for generation of forget gate factor, input factor, output factor, etc. from a server through network interface module 712.

The various components and modules of the computing device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the figures and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method comprising:
    performing computations based on input data received from an application to generate intermediate outputs of a neural network layer;
    generating outputs of the neural network layer based on applying activation function processing on the intermediate outputs;
    receiving a mean and a standard deviation of reference outputs of the neural network layer;
    for each of the outputs of the neural network layer:
        determining a difference between the each output and the mean;
        comparing the difference against one or more thresholds, the one or more thresholds determined based on a pre-determined multiplier of the standard deviations; and
        determining, based on a result of the comparison, whether the each output is an outlier output;
    determining a total count of the outlier outputs;
    determining that the input data are improper based on a comparison between the total count and a second threshold; and
    based on determining that the input data are improper, performing at least one of: transmitting a notification to the application, or suspending computations of a subsequent neural network layer at arithmetic circuits.

2. The method of claim 1, further comprising: receiving configuration data indicating the pre-determined multiplier from the application.

3. The method of claim 1, wherein the reference outputs of the neural network layer are obtained from processing of a set of training data set by a neural network including the neural network layer.

4. The method of claim 1, further comprising: determining that the input data are improper based on the totals of the outlier outputs of a plurality of neural network layers.

5. A system comprising:
    hardware circuits configured to receive input data and to perform computations of a neural network based on the input data to generate computation outputs, the neural network having been trained using a set of training data, wherein the hardware circuits comprise:
        activation function circuits configured to apply activation function processing to generate the computation outputs; and
    an improper input detection circuit configured to:
        determine a relationship between the computation outputs generated by the activation function circuits and reference outputs, wherein the reference outputs are generated based on processing the set of training data using the neural network;
        determine that the input data are improper based on the relationship; and
        perform an action based on determining that the input data are improper.

6. The system of claim 5, wherein the input data deviate from the set of training data used to train the neural network by at least a pre-determined margin.

7. The system of claim 5, wherein the hardware circuits further comprise:
    arithmetic circuits configured to perform arithmetic operations to generate intermediate outputs, and wherein the activation function circuits are configured to apply the activation function processing on the intermediate outputs to generate the computation outputs.

8. The system of claim 5, wherein the improper input detection module is configured to determine the relationship between the computation outputs and the reference outputs based on comparing the computation outputs against one or more thresholds related to a mean and a standard deviation of the reference outputs.

9. The system of claim 8, wherein the improper input detection module is configured to:
    for each of the computation outputs:
        determine a difference between the each of the computation outputs and the mean; and
        determine whether the each of the computation outputs is an outlier output based on comparing the difference with a first threshold based on a pre-determined multiples of the standard deviation;
    determine a count of the outlier outputs; and
    determine that the input data are improper based on comparing the count against a second threshold.

10. The system of claim 9, wherein the improper input detection module is configured to receive detection configuration information from an application that provides the input data; and
    wherein the detection configuration information include definitions of the first threshold and the second threshold.

11. The system of claim 10, wherein the neural network comprises multiple neural network layers; and
    wherein the improper input detection module is configured, based on the detection configuration information, to determine that the input data are improper based on the count of the outlier outputs in the computation outputs for one neural network layer of the multiple neural network layers.

12. The system of claim 11, wherein the improper input detection module is configured, based on the detection configuration information, to determine that the input data are improper based on a location of the one neural network layer within the neural network.

13. The system of claim 5, wherein the improper input detection module is configured to:
determine first statistical parameters of the computation outputs;
receive second statistical parameters of the reference outputs; and
determine the relationship between the computation outputs and reference outputs based on comparing the first statistical parameters and the second statistical parameters.

14. The system of claim 13, wherein the neural network comprises multiple neural network layers; and
wherein the improper input detection module is configured to:
determine a mean and a standard deviation of the computation outputs of each neural network layer of the multiple neural network layers; and
generate a record of the means and the standard deviations of the computation outputs of the each neural network layer.

15. The system of claim 5, wherein the improper input detection module is configured to perform the action, the action comprising at least one of: transmitting an error notification to an application that uses the computation outputs, or suspending computations of the neural network at the hardware circuits.

16. The system of claim 5, wherein the hardware circuits are part of a neural network processor; and
wherein the improper input detection module is part of an application that interfaces with the neural network processor.

17. A method, comprising:
receiving, from hardware circuits, computation outputs of a neural network based on input data provided by an application, the neural network having been trained using a set of training data, wherein the hardware circuits comprise activation function circuits that apply activation function processing to generate the computation outputs;
determining a relationship between the computation outputs generated by the activation function circuits and reference outputs, wherein the reference outputs are generated based on processing the set of training data using the neural network;
determining that the input data are improper based on the relationship; and
performing an action based on determining that input data are improper.

18. The method of claim 17, further comprising:
receiving a mean and a standard deviation of a distribution of the reference outputs; and
wherein determining the relationship between the computation outputs and the reference outputs comprises:
determining a difference between each of the computation outputs and the mean; and
determining that the input data are improper based on comparing the difference against a threshold derived from the standard deviation.

19. The method of claim 18, wherein the action comprises at least one of: transmitting an error notification to the application, or suspending computations of the neural network at the hardware circuits.

* * * * *